United States Patent Office 2,982,129
Patented May 2, 1961

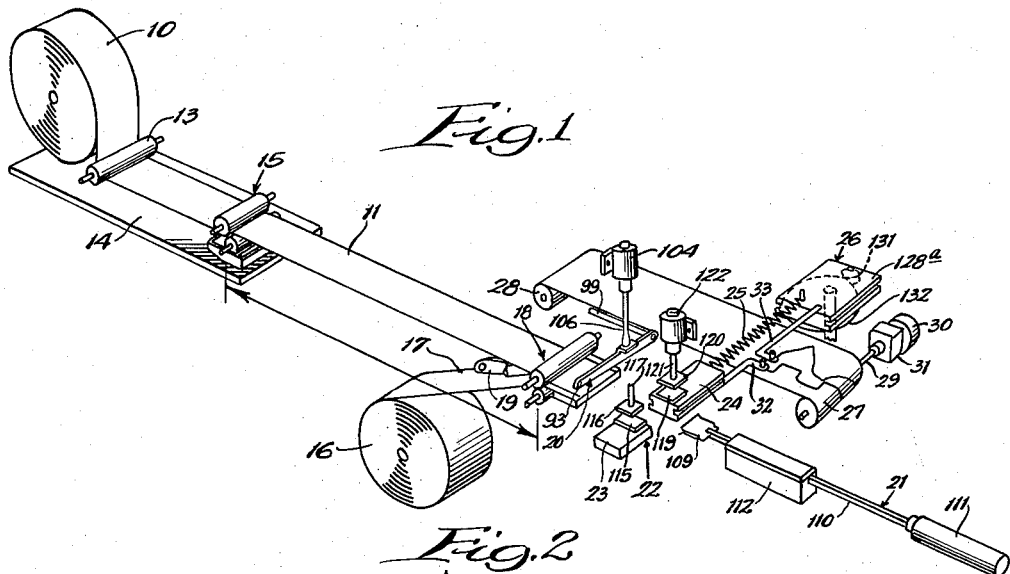

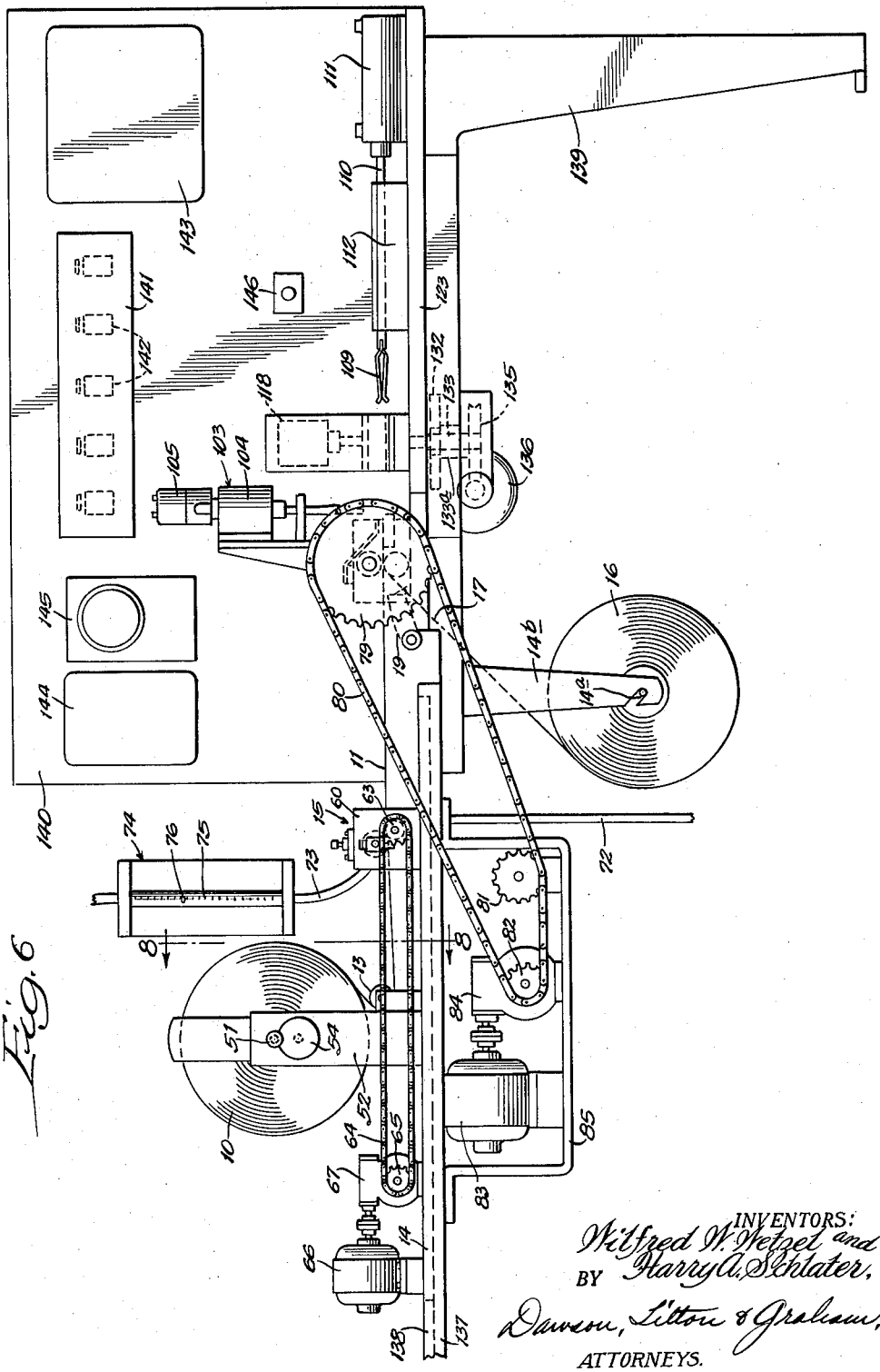

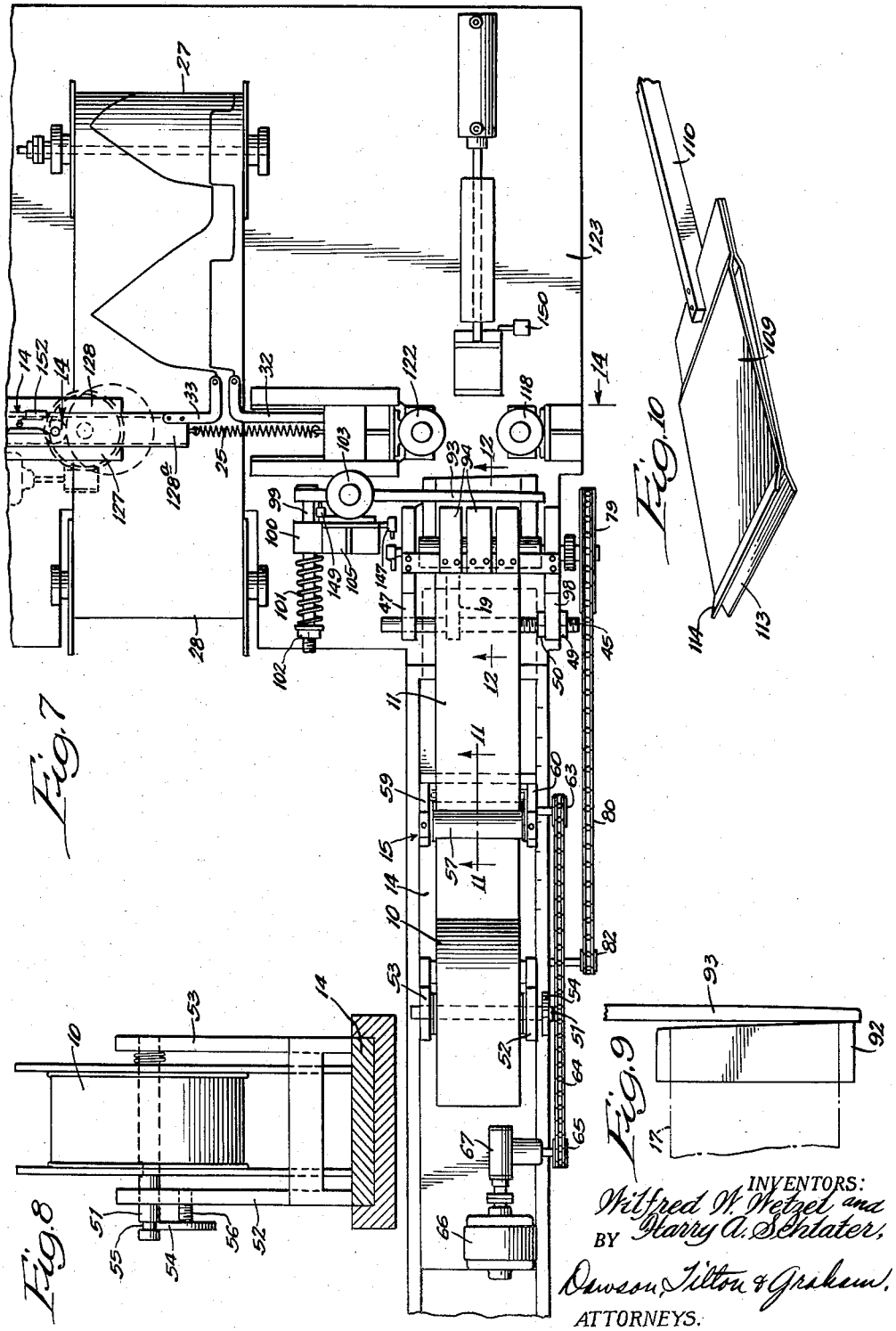

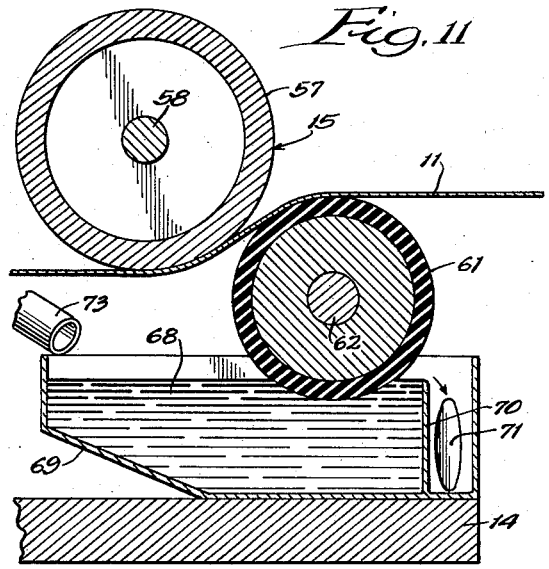
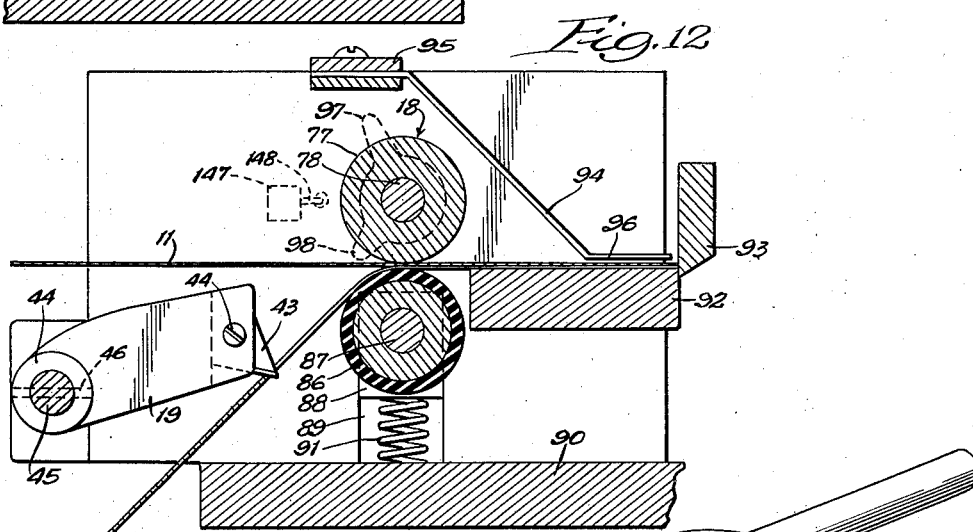
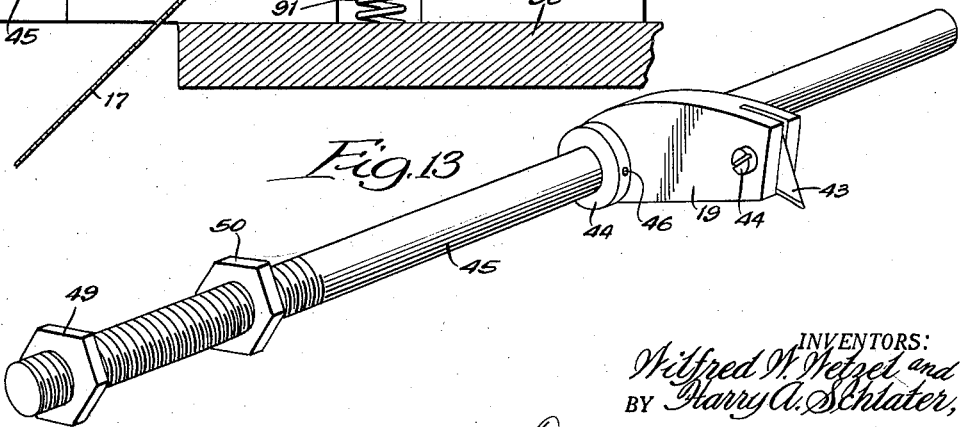

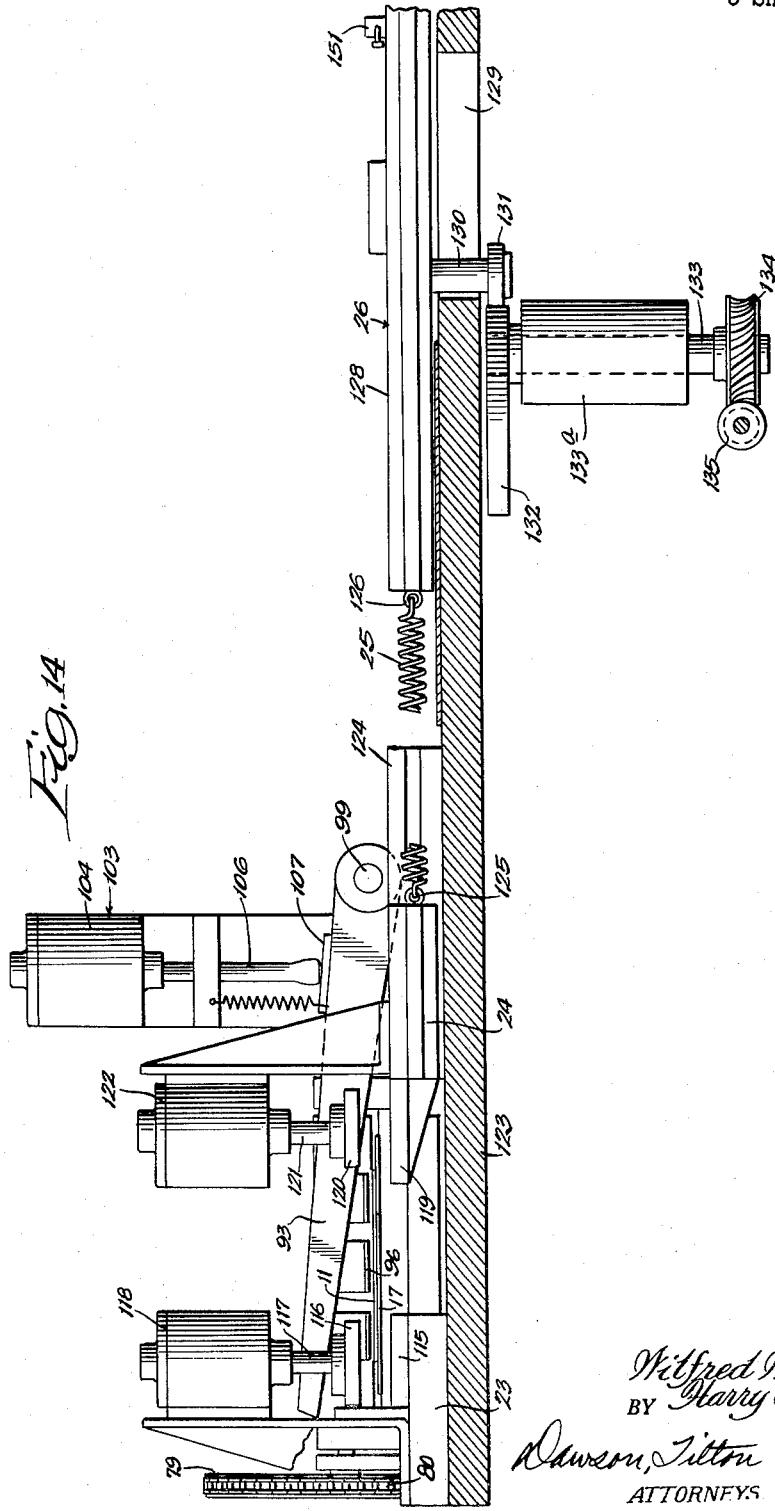

2,982,129

METHOD FOR TESTING GUMMED TAPE

Wilfred W. Wetzel, St. Paul, Minn., and Harry A. Schlater, La Grange Park, Ill., assignors to Minnesota Mining and Mfg. Co., St. Paul, Minn., a corporation of Delaware Filed Nov. 12, 1954, Ser. No. 468,232

5 Claims. (Cl. 73—150)

This invention relates to a method for testing gummed tape, and more particularly to a method for testing the wet strength in shear of the adhesive coating on gummed tape. The terms "shear" and "shear strength" throughout this application are used in the sense of their being synonymous to the terms "web grab," "resistance to slippage" and "resistance to skate," which are frequently used in the trade as defining the properties of the type herein being considered.

Testing the shear strength of a wet adhesive to determine the gripping ability thereof is desirable and frequently necessary for it permits quality control of the tape that is coated with the adhesive, and thereby permits the provision of a gummed tape that will satisfy the conditions characteristic of any particular usage. For example, as is well known, cardboard boxes and cartons have flaps that are closed after the cartons have been filled, and frequently the flaps are locked in closed position by applying a strip or strips of gummed tape thereto. The normal position of the closure flaps is that in which they are open to provide free access to the interior of the cartons. Therefore, when these flaps are folded downwardly, they do not unyieldingly lay in the folded position but tend to spring outwardly and into their normal open position. Therefore, when tape strips are applied thereto the flaps, in their tendency to spring open, apply a force to the wet adhesive of the tape causing it to slip relative thereto. The tendency of the tape to resist this slippage while developing its final set and/or dry bond strength is referred to as the wet grab ability of the tape, or its shear strength. If the shear strength of a tape can be determined under laboratory conditions, the character of the adhesive being used can be related to given applications, and the necessary width of the tape to be used to resist the slippage in any given application can be determined with accuracy.

Apparatus has been provided which is intended to determine the strength in shear of a wet adhesive. Such known apparatus, however, has not been completely satisfactory, for the test results have depended to a large measure upon the timing of the operator of the testing machine; and since this timing varies considerably from test to test and from operator to operator, the accuracy of the test results has not been great and the results have not been dependable.

We have determined that a number of important factors influence the shear strength of gummed tape. Among the most important are: the character of the wetting agents used in the moistening water; the amount of water applied to the adhesive; the elapsed time between wetting of the adhesive and application of the tape; the pressure used in applying the tape to a package or carton; the elapsed time between the wetting of the tape and the application to the tape of the forces causing slippage thereof; and the moisture content and temperature of both the tape and the carton.

Ordinarily, all of these factors will vary to some extent and in providing a method and apparatus for determining the shear strength of a wet adhesive, it is desirable to provide accurate control over these factors, and to permit selective change thereof so that the importance of the variation in those factors can be ascertained with accuracy.

It is accordingly an object of this invention to provide a method for testing the shear strength of gummed tape in which accurate control of all of these factors is afforded. Still another object of the invention is in the provision of a method for testing the shear strength of a wet adhesive in which the tape carrying the wet adhesive is secured to a strip of material by the application of a laminating force of predetermined magnitude thereto following a controlled wetting of the adhesive, and following also a predetermined elapsed time between the wetting and laminating operations—a predetermined test area being provided, and a force then applied to the tape and the strip of material to which it is secured of progressively increasing magnitude and along the plane of the tape and material, the magnitude of the force being increased until there is a shear failure of the adhesive joint, and the magnitude of that force being then measured.

Additional objects and advantages will appear as the specification proceeds.

The invention is explained in conjunction with apparatus illustrated in the accompanying drawings, in which—

Figure 1 is a perspective view of apparatus employed in the practice of the invention, and which is diagrammatic in the sense that the operating components only are illustrated—the motors, drive gears, shafts, etc. having been removed for purposes of simplicity; Fig. 2 is a top plan view of a strip of gummed tape and the backing material to which it is laminated, and that shows a test sample after being severed from the laminated strip, and that shows also a test sample after a shear force of sufficient magnitude has brought about a separation of the backing material and tape; Fig. 3 is an end view in elevation showing a test sample prior to the testing thereof; Fig. 4 is an end view in elevation similar to that in Fig. 3, but showing the relationship of the backing material and tape of a test sample after a force of sufficient magnitude has brought about the shear failure thereof; Fig. 5 is a broken top plan view showing a record tape that is used to record the magnitude of the shear force required in causing the shear failure of a test sample; Fig. 6 is a broken side view in elevation of apparatus embodying the invention;

Fig. 7 is a broken top plan view showing the apparatus; Fig. 8 is a vertical sectional view taken on the line 8—8 of Fig. 6; Fig. 9 is a broken top plan view showing the characteristics of the sample severing knife; Fig. 10 is a broken perspective view showing a portion of the sample selector; Fig. 11 is a longitudinal sectional view taken on the line 11—11 of Fig. 7; Fig. 12 is a longitudinal sectional view taken on the line 12—12 of Fig. 7; Fig. 13 is a perspective view showing the severing blade that cuts the backing material; and Fig. 14 is a transverse sectional view taken on the line 14—14 of Fig. 7.

Reference will first be made to Fig. 1 in particular which illustrates all of the primary functional components of the apparatus and that, therefore, avails itself of a brief discussion of the operating characteristics of the apparatus. Supported for relatively free rotation by mechanism that will be described in detail later in the application is a parent roll 10 of gummed tape from which the strip of gummed tape 11 is drawn. The strip 11 is pulled under an idler roller 13 that is freely rotatable. The apparatus is equipped with a bed 14 upon which is positioned the wetting roller assembly 15. The strip 11 with the adhesive on the under side thereof passes through the wetting roller assembly and the adhesive thereof is thereby moistened.

Mounted for free rotation below the bed 14 upon a shaft 14a, carried by depending brackets 14b secured to the frame of the apparatus, is a parent roll 16 of base stock material that may be, for example, #60 kraft paper. The brackets 14b are provided with outwardly and upwardly extending slots that receive and support the shaft 14a therein. Drawn from the parent roll 16 is a strip of backing material 17 that, in its path of travel to the combining or laminating roller assembly 18, is cut or severed longitudinally by the severing blade structure 19. The strip of gummed tape 11 and the strip of backing material 17 are joined together as they pass through the laminating roller 18, and a strip of the laminated paper is severed by a severing knife or cutter 20, and the severed strip is picked up by a sample selector structure 21 that moves forwardly so as to catch or select the sample prior to its severance from the laminated strip.

After a test sample has been picked up by the sample selector 21, it is carried rearwardly thereby and is placed within the test jaw assembly 22 that comprises a stationary test jaw 23 and a movable test jaw 24. Following the positioning of the test sample in the test jaws, those jaws are actuated to clamp the test sample securely therein. Thereafter, the movable jaw 24 has a force applied thereto through the tension spring 25 and cam assembly 26 that is moved longitudinally relative to the spring 25, and thereby applies a force thereto that is transferred to the jaw 24. The magnitude of the force is progressively increased until the point is reached at which there is a shear failure in the wet adhesive film of the test sample, and then the jaw 24 moves quickly along the longitudinal axis of the spring 25. While ordinarily the force applied, when of sufficient magnitude, will cause a failure in shear of the wet adhesive of the test sample, the shear strength of adhesive may be so great that the tape 11 and/or the backing material 17 will break or fail in tensile before there is a failure in shear of the adhesive joint.

It is a requirement that the magnitude of the force that ultimately brings about a failure of the test sample be measured in some manner. The precise means for measuring the magnitude of the force may vary considerably, but we have used and found satisfactory a record tape 27 that is drawn from a roll 28 and is wound about a shaft 29 that is driven by a motor 30 and gear reducer 31. The record paper may be plain or it may have graph lines, etc. that will enable the operator of the apparatus to read directly from the paper the magnitude of the shear force. A permanent record is made upon the paper by means of the stylus 32 that is rigidly secured to the movable jaw 24, and stylus 33 that is rigidly secured to the movable cam assembly 26. The stylus 32 and the stylus 33 will both be equipped with a pencil or similar writing instrument which will mark the paper 27. As the paper moves longitudinally below the styli 32 and 33, parallel lines 34 and 35 will be drawn on the paper 27, as is seen best in Fig. 5. As the cam assembly 26 is moved rearwardly so as to apply a force to the jaw 24, the stylus 33 will move transversely on the paper 27 and an inclined line 36 will be drawn on the paper. When the application of force is of sufficient magnitude so as to cause a failure of the test sample, the jaw 24 will be drawn rearwardly by the force applied thereto through the spring 25, and a transverse line 37 will be drawn on the paper 27. The point at which the transverse line 37 starts indicates the point at which the magnitude of the force, as represented by the inclined line 36, is sufficient to cause failure of the test sample. Therefore, by measuring the distance 38 between the line 35 and the point on the line 36 at which a shear failure occurred, the magnitude of the shear force is ascertained by simply changing the distance 38 to an equivalent force, or by calibrating the paper 27 to read the distance in terms of force measurements.

Reference will now be made to Figs. 2, 3 and 4 which show the arrangement of the gummed paper 11 and the strip of backing material 17, as well as a sample 39 that has been severed from the laminated strips, and the sample 39a after a sufficient force has been applied thereto to cause a shear failure of the wetted adhesive. The backing material strip 17 may be formed from many suitable materials, but ordinarily will be a paper such as a #60 kraft paper. The tape 11 may have an adhesive coating that provides various degrees of shear strength, and the adhesive composition may be formed from any desired formula. The backing material 17 is preferably wider than the tape 11 and should provide an edge portion 40 that extends outwardly and beyond one longitudinal edge of the tape 11. The sample 39 may have any suitable width and the width will be determined by the frequency of operation of the cutter assembly 20. We have found that a sample width of one inch provides desirable test results.

As the backing strip 17 is drawn from the parent roll 16, the severing blade 19 cuts the same longitudinally along the line of severance 41. As a result thereof, the backing material 17 provides two separate longitudinal strips of material, and for purposes of identification these are designated with the numerals 17a and 17b. After the sample 39 has been severed from the laminated strips, the sample is clamped within the stationary test jaw 23 and movable test jaw 24. The precise relationship of the sample to the test jaws is as follows: the strip 17b and the tape 11 laminated thereto are gripped within the test jaw 23, while the outwardly extending edge portion 40 of the strip 17a is clamped within the test jaw 24. Thus, when the shear force is applied to the test sample, the actual area under test is that portion of the tape 11 which is laminated to the strip 17a, and that area is designated with the numeral 42. Since the longitudinal width of the test sample 39 is known, as is the transverse width of the test area 42, the magnitude of the force that causes the shear failure of the test sample can be converted into terms of shear strength per unit area as, for example, pounds per square inch.

The transverse width of the test area 42 can be changed simply by altering the position of the severing blade apparatus 19. The blade 19 is equipped with a knife 43 that is removably secured thereto by a cap screw 44, all as is seen best in Fig. 13. The blade 19 is equipped with a collar portion 44 and an elongated shaft 45 extends through the collar and through the blade. The longitudinal position of the blade upon the shaft 45 may be changed by loosening the set screw 46 and shifting the blade to the selected position upon the shaft, and then locking the blade in that position by tightening the set screw 46. The shaft 45 is received within and is freely rotatable within the frame members 47 and 48 (Fig. 7), and the shaft is locked in selected angular positions within the frame members 47 and 48 by the lock nuts 49 and 50 which are threadedly received on one end of the shaft. Thus, by loosening one of the lock nuts the blade 19, and particularly the knife 43 thereof, can be swung into and out of engagement with the strip 17 of backing material.

To provide accuracy in the test results, it is necessary that the area under test—that is, the area 42—be held within acceptable degrees of tolerance, and that is accomplished in the apparatus by aligning relatively accurately the parent roll 10 of tape with respect to the backing strip 17. By referring to Figs. 6 and 8, it is seen that the parent roll 10 is rotatably carried upon a shaft 51 that extends beyond the standards 52 and 53 that are rigidly secured to the bed 14. The shaft 51 is shiftable relative to the standards 53, and the spacing between the standards is slightly greater than the width of the parent roll 10. Therefore, if the position of the roll 10 upon the shaft 51 is determined, while permitting the roll to be rotatable relative to the shaft, the alignment of the parent roll can be changed by shifting the shaft 51 and by locking it in the selected shifted position through the latch 54 which is receivable within a notch 55 of the shaft 51. The latch 54 is adjustable relative to the standard 52 by reason of its being carried by a threaded pin 56 that is received within a threaded aperture within the standard 52.

It is desired to control the wetting of the tape strip 11, and this is accomplished in two ways in the apparatus herein disclosed. First, the wetting roller assembly 15 comprises an idler roller or guide roller 57 which is carried on a shaft 58 rotatably supported within journals 59 and 60 (Fig. 7), and the driven wetting roller 61 that is rigidly secured to a shaft 62 that is similarly rotatably carried in the journals 59 and 60, and that is equipped at one end with a sprocket 63 being entrained thereabout and drive chain 64 that, at its other end, is entrained about a drive sprocket 65 that is driven by a motor 66 through a gear reducer 67. By changing the rotational speed of the wetting roller 61 through the variable speed motor 66, the amount of water applied to the tape strip 11 can be varied, and that selective variation provides control over the wetting.

More accurate control of the wetting is also provided by carefully controlling the volume of water 68 within the wetting tank or reservoir 69 that is carried by the bed 14. The reservoir 69 is provided with a weir 70 that controls or determines the height or volume of water 68 within the reservoir so long as a sufficient supply of water is provided for the reservoir. Adjacent the weir 70 is an outlet opening 71 that is connected to a drain tube 72 (Fig. 6) that carries overflow water to a suitable drain.

The volume of water delivered to the reservoir 69 through the supply tube 73 is controlled by measuring the supply water flowing through the measuring apparatus 74 that provides a scaled tube 75 having a float 76 therein that stabilizes at the graduations representative of the volume of liquid flowing through the tube and into the tank 69. This type of measuring apparatus is well known in the art, and will not then be described in detail. Water will be supplied thereto from a suitable source, and preferably one at which the water temperature is known.

It will be appreciated that wetting agents may be added to the water being fed into the reservoir 69 if this is desired, and if such wetting agents are employed then, of course, they will be taken into consideration in the test results obtained.

As has been indicated before, the test results are influenced by the laminating pressure applied by the combining or laminating roller assembly 18. The assembly 18 comprises a driven roller 77 that is rigidly secured to a shaft 78 that is journaled in extensions of the frame members 47 and 48, as is seen best in Fig. 7 (reference is now being made in particular to Figs. 6 and 12). The shaft 78 at one end thereof has secured thereto a sprocket 79, and entrained thereabout is a link chain 80 that travels over a pick-up idler gear 81, and that is also entrained about a drive sprocket 82 that is rotatably driven by a motor 83 through a gear reducer 84. The motor 83, as well as the gear reducer 84 and idler gear 81, are all rigidly secured to a strap or bracket 85 that extends downwardly from and is carried by the frame of the apparatus.

Also forming a part of the laminating roller assembly is the idler pressure roller 86 that preferably has a covering or tire thereon formed of resilient material such as rubber, as is indicated in Fig. 12. The roller 86 is rotatably carried upon the shaft 87, and that shaft is carried at each end thereof in bearing blocks 88 that are movable vertically in support members 89 that are rigidly secured and that extend upwardly from the top 90 of the frame of the apparatus. The bearing blocks 88, and therefore the roller 86, are urged upwardly by the coil springs 91 that seat at one end upon the top 90 and at their other end upon the bearing blocks 88. Thus, the roller 86 is resiliently urged against the drive roller 18. The force exerted by the coil springs 91 is a known predetermined value and, therefore, the laminating pressure applied by the rollers 77 and 86 is a known quantity. The springs 91 also serve the additional function of maintaining the laminating pressure at a uniform value even though slight irregularities and differences in the thickness of the backing material 17 or tape 11 and its adhesive coating may occur from time to time.

Adjacent the roller assembly 18 is the cutter or knife assembly 20, and that latter assembly includes a stationary knife 92 that has a forward edge portion that extends downwardly and at a right angle, as is shown best in Fig. 12, and that also extends in a horizontal plane at a slight inclination, as is shown best in Figs. 7 and 9. The horizontal inclination causes the movable knife 93 to travel forwardly as it moves against the forward edge of the stationary knife, and that progressive forward movement as the knife 93 performs a cutting operation insures uniform engagement between the knives 92 and 93 throughout a complete cutting operation, with the result that the severance of the sample 39 is clean and uniform.

The guides 94 rigidly secured at their upper ends to the transverse support 95, which in turn is carried by the frame members 47 and 48, are provided with laterally turned horizontal end portions 96 that are spaced slightly above the stationary knife 92 and guide the laminated strips comprising the backing member 17 and tape 11 against the stationary knife. It is also seen in Fig. 12 that the driven laminating roller 77 is provided with a pair of extensions or cams 97 and 98 that, in the rotational movement of that roller, are operative to actuate a microswitch, as will be described hereinafter.

The movable knife 93 is secured to a shaft 99 that is axially slidable within a bearing member 100. A coil spring 101 encloses the end portion of the shaft 99 that extends rearwardly beyond the bearing member 100, and seats at one end upon that bearing member and at its other end against a nut 102 that is threaded into the threaded end portion of the shaft 99. The spring 101 biases the movable knife 93 rearwardly and against the stationary knife 92 so that the clean severance of the test sample 39, as described hereinbefore, is insured.

The movable knife 93 is actuated by a power cylinder 103 that comprises a fluid pressure (preferably, pneumatic fluid pressure) operated piston and cylinder unit 104 and a solenoid controlled valve 105 therefor. The piston within the cylinder 104 is equipped with a rod or plunger 106 that at its lower end engages a bed plate 107 that is attached to the top of the movable cutter 93 to increase the contact area thereof. Thus, when the piston is actuated by the application of pressure fluid to the cylinder 104, the knife 93 is moved downwardly about a pivotal axis defined by the shaft 99.

When a sample is severed from the laminated strips by the cutter assembly 20, it is picked up by the sample selector 21. The selector 21 comprises a spring clip 109 that is rigidly secured to the end of an elongated plunger 110 that is operatively arranged with a piston (not shown) slidably carried within a double-acting fluid or air cylinder 111. To stabilize the elongated plunger 110, a bearing block 112 is provided and the plunger slides longitudinally therethrough. The sample selector is arranged so as to move the spring clip 109 to a position adjacent the knife or cutter assembly 20 prior to the severance of a test sample 39 from the laminated strip of material. That test sample is picked up between the jaws of the spring clip 109 which diverge at their forward ends 113 and 114, as is best shown in Fig. 10. When the test sample has been severed, the plunger 110 is drawn rearwardly so as to deposit the test sample within the jaws 23 and 24 of the test jaw assembly. The speed of movement of the sample selector 21 may be controlled by throttling the air supply to the cylinder 111, and preferably the movement of the spring clip 109 is arranged so that the test sample does not buckle during the pick-up thereof.

The test jaw assembly 22, and particularly the stationary jaw 23 thereof, comprises a lower stationary jaw member 115 and an upper vertically movable jaw member 116 that is carried upon the plunger 117 of a solenoid controlled cylinder 118. Similarly, the movable jaw 24 comprises a lower stationary jaw member 119 and an upper movable jaw member 120 that is secured to the plunger 121 of a solenoid controlled cylinder 122. When the cylinders 118 and 122 are energized, the upper jaw members 116 and 120 respectively are moved downwardly and into tight engagement with the lower jaw members 115 and 119. Thus, a test sample interposed therebetween is securely gripped by the jaw members.

The stationary jaw 23 is rigidly secured to a lateral extension 123 of the top or table 90 of the apparatus, as is shown best in Fig. 14. The movable jaw member 24, on the other hand, is slidably supported between the spaced rail members 124 that are carried by the extension 123. The spring 25 that applies force to the jaw member 24 is connected thereto and to the cam assembly 26 by any suitable means, such as the eye members 125 and 126.

The cam assembly 26 comprises a pair of guide rail members 127 and 128 that are spaced apart and that slidably carry a bar 128a that is secured to the stylus 33 described heretofore. The bar 128a is movable along the extension 123 between the rails, and that extension is provided with a slot 129 therethrough, and a stub shaft 130 rigidly secured to the bar 128a and extending through the slot 129 carries at its lower end a bearing 131 having a rotatable race that engages and rides on the peripheral surface of a drive cam 132 that is rigidly secured to a shaft 133 journaled within a bearing support block 133a and extending downwardly therefrom. The block 133a is rigidly attached to the frame of the apparatus. Also rigidly secured to the shaft 133 is a driven gear 134 that, as is seen best in Fig. 6, has meshing therewith a drive worm 135 that may be driven through an appropriate gear reducer by the motor 136. Through this arrangement, rotation of the motor 136 will rotate the shaft 133 and the drive cam 132 secured thereto. Since the drive cam makes driving contact with the bearing race or cam follower 131, the shaft 130 and the bar 128a will be forced rearwardly by the drive cam. The rate of application of the test load can be varied by means of a variable speed transmission coupled to the motor 136 thereby enabling the bar 128a to be driven rearwardly at various linear speeds.

It has been stated heretofore that it is desired to control and regulate the time between application of moisture to the adhesive of the tape and the application of the tape to the backing material. This we accomplish by making the bed 14 movable upon the frame platform 137. If desired, guides 138 may be provided adjacent the longitudinal edges of the bed 14 to confine the bed 14 in its transverse position upon the platform 137. Ordinarily, it is not necessary to provide means for locking the bed 14 in a preselected position upon the member 137, for the weight of the bed and the apparatus carried thereby provides a sufficient frictional force to maintain it in any selected position. However, if locking means are desired, conventional structures may be employed; and also if desired, a rack and gear arrangement may be used to shift the bed 14 relative to the support 137 therefor. As is shown in Fig. 6, the apparatus is equipped with leg members 139 that elevate the top of the apparatus etc. above floor level.

Also shown in Fig. 6 is a control panel 140 that may be located adjacent the apparatus or at a point remote therefrom. The control panel will carry a relay block 141 having a plurality of relays 142 and a timer mechanism 143 that controls the energization of the motor 136 that drives the cam assembly 26. The control panel 140 may also have a terminal block 144 and a meter 145. The operation of the relays and the other elements carried by the control panel 140 will be described subsequently.

The control panel 140 is also provided with a push-button switch 146, and this push-button switch or momentary switch is operative when actuated to set up the circuit with which it is arranged to carry out a timed, sequential operation in which a test sample is severed from the laminated strip and subsequently subjected to a shearing force, etc. If the control panel 140 is located remotely from the remainder of the apparatus, the switch 146 then might be more conveniently located on the frame of the apparatus rather than on the control panel and such a change, it will be apparent, can be made quite readily.

As is seen best in Figs. 7 and 12, a microswitch 147 is mounted adjacent one end of the laminating roller 77 and is provided with a toggle member 148 that is adapted to be depressed by the cam members 97 and 98 during rotation of the roller 77. The switch 147 is connected in circuit with the solenoid 105 that controls the power cylinder 104 that actuates the knife 93. When the main switch 146 is depressed and one of the cam members 97 or 98 actuates the switch 147, the movable knife 93 severs the laminated tape and backing strip; and again, upon the actuation of the switch 147 by the other of the cam members 97 and 98, the movable knife severs the laminated strip to cut a test sample therefrom. The switch 147 is also operative upon initial actuation thereof to energize the power cylinder 111 of the sample selector 21, and the selector moves rearwardly so as to engage the test sample prior to the severance thereof from the laminated strips. Upon the second actuation of the switch 147, the sample selector apparatus 21 commences its return stroke, and at that time the severed sample is held within the spring clip member 109.

The switch 149 may be mounted beneath the movable knife 93 so as to be actuated thereby when that knife moves downwardly in a severing operation. The switch 149 is operative to condition the circuit with which it is arranged so as to prevent recycling of the apparatus. A switch 150 is mounted adjacent the spring clip of the sample selector 21 so as to be actuated thereby when the sample selector is moved rearwardly and into its normally retracted position. The switch 150 is arranged in circuit with the solenoid controls for the power cylinders so as to actuate those cylinders and thereby move the jaw members 116 and 117 into clamping relation with a test sample that is received therein. At the same time, the circuit arrangement of the switch 150 is such that it energizes the cam motor 136 so that the motor is conditioned to draw the cam assembly 26 rearwardly and thereby impose a force upon the movable jaw 24. However, the energization of the motor 136 is dependent upon the setting of the timer 143 which is in circuit therewith, and even though the switch 150 conditions the motor 136 for operation, operation is not commenced until the time interval set by the timer 143 has elapsed. It will be appreciated then that control is provided over the time that elapses between the laminating of the tape 11 to the backing member 17 and the application of the shearing force to the test sample.

The switch 151 adjacent the movable cam assembly 26, and normally spaced rearwardly thereof, is arranged so as to be actuated by the cam assembly as it moves to its most rearward position. That switch 151 is operative to bring about a de-actuation of the power cylinders 118 and 122 that actuate the clamp jaws. A further switch 152 is arranged with relation to the cam assembly 26 so as to be actuated by the cam assembly when it is returned to its initial position (Fig. 7 for the switch). The switch 152 is operative to put in their proper arrangement the circuit relays to condition the circuit for the start of another cycle of operation.

The circuit connections for all of the switches, relays, controls for the power cylinders and for the motors are not herein shown for per se they form no part of this invention and can be provided readily by those who are skilled in the art. It is believed that it will be quite apparent to those skilled in the art, from the sequence of operations that has been described, what circuit connections are required to bring about that sequence of operations.

*Operation*

In operation of the apparatus, a roll of gummed tape 10 and a roll of base stock 16 are both mounted in the manner heretofore described, and the strips 11 and 17 that are drawn therefrom are fed between the laminating rollers 77 and 86 that form the laminating assembly 18. The transverse width of an area to be tested is determined by the position of the blade 19, and the position of that blade can be varied as required. The desired delay between the application of moisture to the adhesive of the tape strip 11 and the lamination or application of that strip to the backing material 17 will be arranged by simply moving the bed 14 along the frame of the apparatus to provide a spacing between the wetting roller assembly 15 and laminating roller assembly 18 that will give the desired time delay therebetween.

Also, the amount of moisture to be applied to the adhesive by the wetting roller 61 will be determined by varying the operating speed of the motor 66, and also by controlling the volume of water flowing through the measuring device 74. Thus, at this point control and regulation have been provided over the amount of moisture applied to the adhesive, over the elapsed time between wetting of the adhesive and application of the tape, and over the width of the area under test.

The laminated strip will be fed continuously over the stationary knife 92, and there will be no severance of test samples until the momentary switch 146 is depressed. Upon the actuation of that switch, the movable cutter or knife 93 will pivot downwardly and will sever the laminated strip, and that severing movement will be followed closely by another cutting movement of the knife 93 so as to sever from the laminated strip a test sample having a predetermined longitudinal width. The severed sample will be picked up by the spring clip 109 of the sample selector that was moved forwardly upon the first severing operation of the cutter 93. Return movement of the sample selector deposits the test sample between the jaws 23 and 24 which then close to firmly grip the test sample. When the sample selector has been retracted completely, the cam assembly 26 moves laterally so as to apply a force to the spring 25. At the same time, the switch 150 conditions the circuit so as to energize the motor 30 which pulls the record paper under the styli 32 and 33.

The precise moment at which the cam assembly commences its rearward movement will be determined by the setting of the timer 143, and once movement of the cam assembly commences it will continue to move laterally through the range of movement afforded by the cam or eccentric 132. Ultimately, the force applied to the movable jaw 24 by the spring 25 will be sufficient to cause a shear failure in the test sample. The magnitude of that force will be recorded upon the record paper 27, as has been described.

The jaws 23 and 24 are then released and the cam assembly 26 is ultimately returned to its initial position. The circuits are then de-energized and no further samples will be selected and tested until the momentary switch 146 is again depressed.

So far the invention has been described in terms of the apparatus that we have provided. It is believed apparent, however, that inherent in the description of the apparatus are the steps of the method by which a test sample is formed by wetting the adhesive on the gummed tape strip, laminating the tape to a base stock material, severing a test sample from the laminated strip and thereafter applying a force thereto along the plane of the test sample and of sufficient magnitude so as to bring about a shear failure of the test sample. A measurement of the magnitude of the shear force is also made simultaneously with the application of that force to the test sample.

While in the foregoing specification an embodiment of the invention has been described in considerable detail for purposes of illustration, it will be apparent to those skilled in the art that numerous changes may be made in those details without departing from the spirit and principles of the invention.

We claim:

1. In a method of testing the resistance to slippage of a remoistened-adhesive coated tape while the adhesive thereof is moistened, the steps of moistening the adhesive coating of said tape while controlling the amount of liquid applied thereto, laminating the tape to a test material with a controlled laminating force and following a predetermined elapsed time from the moistening of the adhesive, the said test material overlapping said tape to provide said test material with a free edge portion, the said test material being severed longitudinally along a line inwardly of said free edge portion, transversely severing a test sample of predetermined area from the laminated web, applying a force, after a predetermined elapsed time from the lamination, to said test sample between said tape and test material and oriented substantially in the plane defined thereby to cause slippage therebetween, said force being applied to said tape and test material on opposite sides of the line of longitudinal severance and with one point of force application being to said free edge portion, and measuring the magnitude of the force that causes the slippage.

2. In a method of testing the resistance to slippage of a remoistened-adhesive coated tape while the adhesive thereof is moistened, the steps of moistening the adhesive coating of said tape while controlling the amount of liquid applied thereto, laminating the tape to a test material with a controlled laminating force and following a predetermined elapsed time from the moistening of the adhesive, the said test material overlapping said tape to provide said test material with a free edge portion, the said test material being severed longitudinally along a line inwardly of said free edge portion, applying a force, after a predetermined elapsed time from the lamination, to said test sample between said tape and test material and oriented substantially in the plane defined thereby to cause slippage therebetween, said force being applied to said tape and test material on opposite sides of the line of longitudinal severance and with one point of force application being to said free edge portion, and measuring the magnitude of the force that causes the slippage.

3. In a method of testing the shear strength of a wet solvent activated adhesive film coating of tapes, and the like, the steps of moistening the adhesive coating of the tape, controlling the amount of moisture applied thereto, laminating the tape to a longitudinally slitted test material with a controlled laminating force and with the test material laterally overlapping the tape, prior to the setting of the adhesive gripping said test material and tape on one side of the longitudinal slit while gripping only the overlapping portion of said test material on the other side of said longitudinal slit, causing slippage between said tape and said test material by applying a force thereto in the plane of the film, and measuring the magnitude of the force causing slippage.

4. In a method of testing the resistance to slippage of a remoistened-adhesive film coated tape while the adhesive film thereof is moistened, the steps of moistening the adhesive film of said tape while controlling the amount of liquid applied thereto, laminating the tape to a longitudinally-slitted test material with a controlled laminating force following a predetermined elapsed time from the moistening of the adhesive film and with the said test material laterally overlapping said tape, severing a test sample of predetermined area from the laminated web, after a predetermined elapsed time from the lamination, applying opposing forces to the laterally-overlapping edge of said test material and to the laminated material of the tape on the other side of the longitudinal slit, said forces being oriented substantially in the plane of said film to cause slippage between said tape and said material, and measuring the magnitude of the force that causes the slippage.

5. The method of claim 4 in which the position of the longitudinal slit in said test material is controlled.

References Cited in the file of this patent

UNITED STATES PATENTS

| Number | Name | Date |
|---|---|---|
| 444,821 | Feister | Jan. 20, 1891 |
| 758,418 | Cook | Apr. 26, 1904 |
| 857,540 | Robinson | June 18, 1907 |
| 934,845 | Senter | Sept. 21, 1909 |
| 995,465 | Jaegle | June 20, 1911 |
| 1,150,013 | Bordo | Aug. 17, 1915 |
| 1,441,615 | Wellesley | Jan. 9, 1923 |
| 1,575,185 | Stenhouse | Mar. 2, 1926 |
| 1,715,093 | McLaurin | May 28, 1929 |
| 1,836,444 | Carnahan | Dec. 15, 1931 |
| 2,254,394 | Ratley | Sept. 2, 1941 |
| 2,303,621 | Donnelly | Dec. 1, 1942 |
| 2,382,930 | Williams | Aug. 14, 1945 |
| 2,387,631 | Weir | Oct. 23, 1945 |
| 2,424,177 | Lawsae | July 15, 1947 |
| 2,473,517 | Freedman | June 21, 1949 |
| 2,604,783 | Herrlinger | July 29, 1952 |
| 2,751,784 | Gershberg | June 26, 1956 |